(12) United States Patent
Jing et al.

(10) Patent No.: US 11,902,358 B1
(45) Date of Patent: Feb. 13, 2024

(54) DISTRIBUTED TRUSTED SENSING METHOD AND SYSTEM FOR INTEGRATED COMMUNICATION, SENSING AND COMPUTATION NETWORK

(71) Applicant: Beijing University of Posts and Telecommunications, Beijing (CN)

(72) Inventors: Xiaojun Jing, Beijing (CN); Ronghui Zhang, Beijing (CN); Zexuan Jing, Beijing (CN); Yanxi Xie, Beijing (CN); Yuanhao Cui, Beijing (CN); Junsheng Mu, Beijing (CN); Hao Zhang, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 17/938,813

(22) Filed: Oct. 7, 2022

(30) Foreign Application Priority Data

Jul. 19, 2022 (CN) .......................... 202210844397.7

(51) Int. Cl.
*H04L 67/10* (2022.01)
*H04L 9/32* (2006.01)

(52) U.S. Cl.
CPC ............ *H04L 67/10* (2013.01); *H04L 9/3247* (2013.01)

(58) Field of Classification Search
CPC .............................. H04L 67/10; H04L 9/3247
See application file for complete search history.

(56) References Cited

FOREIGN PATENT DOCUMENTS

WO WO-2021158313 A1 * 8/2021 ............. G06N 20/00

* cited by examiner

*Primary Examiner* — Cheikh T Ndiaye
(74) *Attorney, Agent, or Firm* — M&B IP Analysts, LLC (57) ABSTRACT

The present disclosure relates to a distributed trusted sensing method and system for an integrated communication, sensing, and computation network, and relates to the field of wireless sensing technologies. First, a global model and an initial global parameter are transmitted to each edge node. Each edge node performs local training by using local data, to obtain a local model parameter, broadcasts the local model parameter through a corresponding miner, then assigns a weight to each local model parameter, to calculate a global parameter, and updates the global parameter through aggregation iteration. In the present disclosure, calculation is performed by using computation resources and data resources of each distributed edge node, thus saving the overall communication and computation resources.

10 Claims, 3 Drawing Sheets

DISTRIBUTED TRUSTED SENSING METHOD AND SYSTEM FOR INTEGRATED COMMUNICATION, SENSING AND COMPUTATION NETWORK

CROSS REFERENCE TO RELATED APPLICATION

This patent application claims the benefit and priority of Chinese Patent Application No. 202210844397.7, filed on Jul. 19, 2022, the disclosure of which is incorporated by reference herein in its entirety as part of the present application.

TECHNICAL FIELD

The present disclosure relates to the field of wireless sensing technologies, and in particular, to a distributed trusted sensing method and system for an integrated communication, sensing, and computation network.

BACKGROUND ART

With the development of emerging smart services such as autonomous driving, industrial Internet of Things, and smart home, integrated communication, sensing, and computation has emerged, which refers to an end-to-end information processing technology framework that simultaneously performs information collection and information computation during information transmission. For example, during intrusion detection in security scenarios, data is received and transmitted by using multiple wireless nodes, then transmitted wireless signals are analyzed, and a deep neural network model is constructed to automatically extract relevant features of the wireless signals, thereby implementing intrusion detection efficiently. The conventional centralized processing scheme centralizes the data collected by all the nodes on one server for processing, which consumes a large amount of communication and computation resources and also causes privacy leakage and data security risks.

Therefore, there is an urgent need in the field for a technical solution that saves communication and computation resources while preventing privacy leakage and ensuring data security.

SUMMARY

The purpose of the present disclosure is to provide a distributed trusted sensing method and system for an integrated communication, sensing, and computation network, to perform calculation by using computation and data resources of each distributed edge node, thus saving the overall communication and computation resources. In addition, an original dataset of each node is not exposed to each other, thereby ensuring data security and effectively resolving the problems of privacy leakage and data security risks.

In order to achieve the above objective, the present disclosure provides the following technical solutions:

A distributed trusted sensing method for an integrated communication, sensing, and computation network includes:

obtaining, by an edge node, a global model and an initial global parameter, and locally training the global model by using local data, to obtain a local model parameter;

uploading, by the edge node, the local model parameter to a corresponding miner, where each edge node corresponds to one miner;

saving and broadcasting, by each miner, the received local model parameter;

storing, by a miner receiving broadcast information, the received local model parameter in a memory pool;

sending, by the miner, local model parameters in the memory pool to the corresponding edge node when a number of the local model parameters in the memory pool of the miner exceeds a specified threshold;

assigning, by the edge node, a weight to each of the received local model parameters and the local model parameter of the edge node based on validity of the local model parameters;

performing, by the edge node based on the weight, weighted aggregation on all the received local model parameters and the local model parameter of the edge node, to obtain an iterative global parameter;

adding, by the miner, the iterative global parameter to a generated block, and broadcasting and performing digital signature verification on the iterative global parameter; and determining, by the edge node, whether the iterative global parameter meets a preset condition; and if yes, using the iterative global parameter as a final global parameter; or if not, substituting the iterative global parameter into the global model, and returning to the step of locally training the global model by using local data, to obtain a local model parameter.

The present disclosure further provides a distributed trusted sensing system for an integrated communication, sensing, and computation network. The system includes multiple edge nodes and multiple miners, where each edge node corresponds to one miner; and the edge nodes each are configured to:

obtain a global model and an initial global parameter, substitute the initial global parameter into the global model, and locally train the global model by using local data, to obtain a local model parameter;

upload the local model parameter to a corresponding miner;

assign a weight to each of received local model parameters and the local model parameter of the edge node based on validity of the local model parameters;

perform, based on the weight, weighted aggregation on all the received local model parameters and the local model parameter of the edge node, to obtain an iterative global parameter;

determine whether the iterative global parameter meets a preset condition; and if yes, use the iterative global parameter as a final global parameter; or if not, substitute the iterative global parameter into the global model, and return to the step of locally training the global model by using local data, to obtain a local model parameter; and the miners each are configured to:

save and broadcast the received local model parameter;

store the received local model parameter in a memory pool;

send local model parameters in the memory pool to the corresponding edge node when a number of the local model parameters in the memory pool exceeds a specified threshold; and add the iterative global parameter to a generated block, and broadcast and perform digital signature verification on the iterative global parameter.

According to the specific embodiments provided in the present disclosure, the present disclosure discloses the following technical effects:

The present disclosure provides a distributed trusted sensing method and system for an integrated communication, sensing, and computation network. A global model and an initial global parameter are transmitted to each edge node. Each edge node performs local training by using local data, to obtain a local model parameter, broadcasts the local model parameter through a corresponding miner, then assigns a weight to each local model parameter, and updates the global parameter through aggregation iteration. In the present disclosure, calculation is performed by using computation and data resources of each distributed node, thus saving the overall communication and computation resources. In addition, in the present disclosure, a dataset of each node is used for training only, and the local model parameter obtained from training is broadcast and used for subsequent calculation. Thus the original dataset of each edge node is not exposed to each other, thereby ensuring data security and effectively resolving the problems of privacy leakage and data security risks.

DETAILED DESCRIPTION OF THE EMBODIMENTS

To improve sensing performance in the integrated communication, sensing, and computation network, sensing and computation load needs to be shared through distributed computation collaboration, and efficient data communication among the nodes is also needed. However, edge devices are often massive and untrustworthy, which poses a great security risk for the integrated communication, sensing, and computation network.

To address the above problems, the present disclosure proposes a resource-efficient distributed trusted sensing solution and introduces federated learning and the blockchain, to provide a resource-efficient trusted sensing network architecture for the integrated communication, sensing, and computation network.

The purpose of the present disclosure is to provide a distributed trusted sensing method and system for an integrated communication, sensing, and computation network, to perform calculation by using computation and data resources of each distributed edge node, thus saving the overall communication and computation resources. In addition, an original dataset of each node is not exposed to each other, thereby ensuring data security and effectively resolving the problems of privacy leakage and data security risks.

To make the above-mentioned objective, features, and advantages of the present disclosure clearer and more comprehensible, the present disclosure will be further described in detail below in conjunction with the accompanying drawings and specific embodiments.

Embodiment 1

Figure 1:
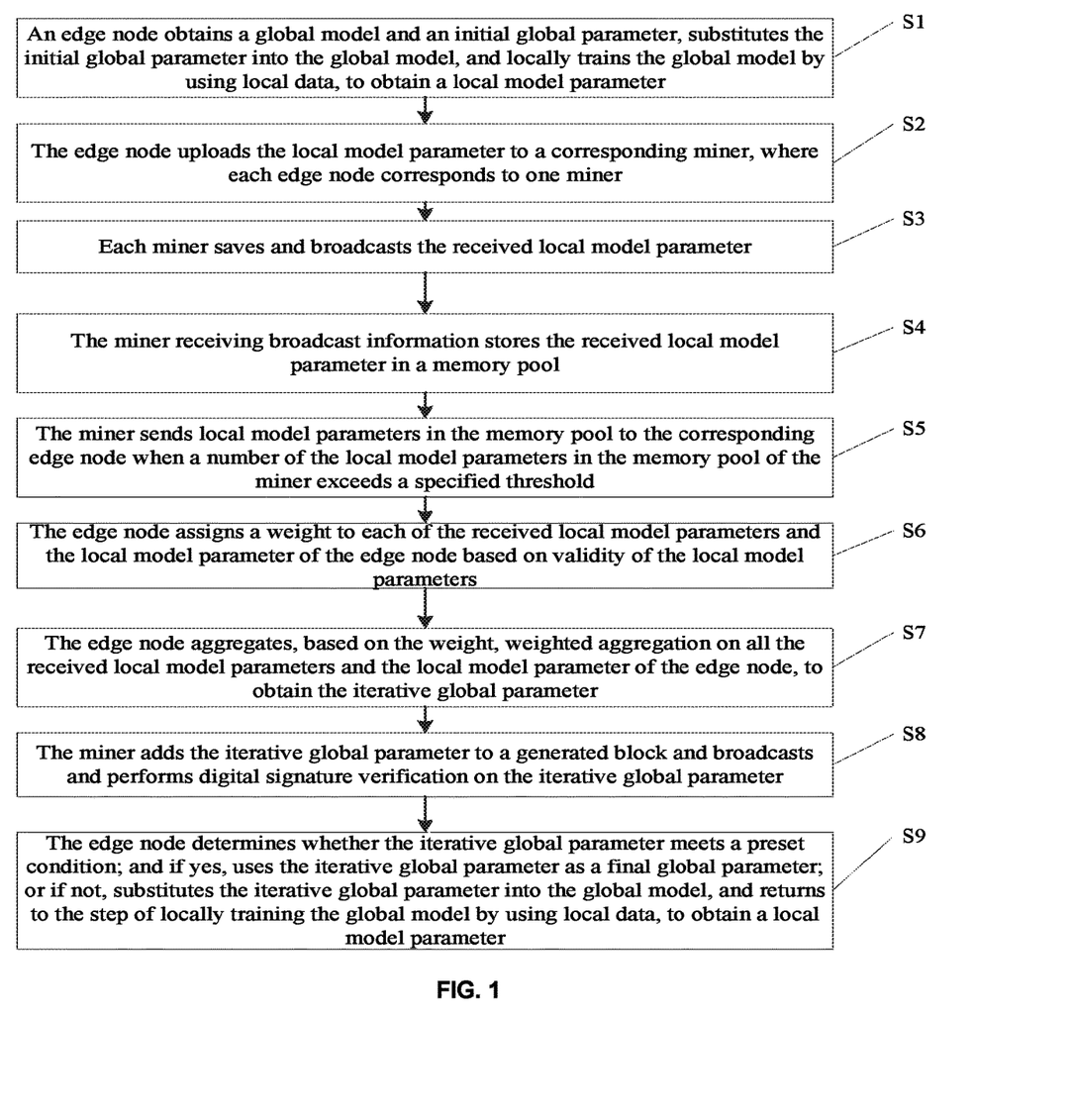
FIG. 1 is a flowchart of a distributed trusted sensing method for an integrated communication, sensing, and computation network according to Embodiment 1 of the present disclosure.

As shown in FIG. 1, this embodiment provides a distributed trusted sensing method for an integrated communication, sensing, and computation network. The whole framework may be divided into two layers: a blockchain layer and a computation layer. In the computation layer, there are many mutually independent devices called distributed computing nodes or edge nodes. The set of the edge nodes may be defined as $D=\{D_1, D_2, \ldots, D_{N_D}\}$, where $D_i$ ($i=1, 2, \ldots, N_D$) indicates an $i^{th}$ edge node and $N_D=|D|$ indicates a total number of the edge nodes. In the conventional centralized processing scheme, only one global deep neural network model is constructed for sensing and computation tasks. In this framework, each edge node in the computation layer stores a copy of the global deep neural network model, referred to as a local model, and further stores a private dataset, that is, a local dataset. A local dataset of the edge node $D_i$ is denoted as $S_i$. The local model is trained by using the local dataset, to obtain a local model parameter. In the blockchain layer, there are many virtual miners. The set of the miners may be defined as $M=\{M_1, M_2, \ldots, M_{N_M}\}$, where $M_j$ ($j=1, 2, \ldots, N_M$) indicates a $j^{th}$ miner and $N_M=|M|$ indicates a total number of the miners. Each edge node in the computation layer is connected to one miner virtually. The number of the miners should be larger than the number of the edge nodes, to ensure that each edge node can be connected to one miner, that is, $N_D<N_M$. After the local model is trained, the edge node uploads the local model parameter to the corresponding miner. The miner treats the local model parameter as a transaction and performs operations such as broadcasting, verification, and mining. Specifically, the resource-distributed trusted sensing method for an integrated communication, sensing, and computation network according to this embodiment specifically includes the following steps:

S1: An edge node obtains a global model and an initial global parameter, substitutes the initial global parameter into the global model, and locally trains the global model by using local data, to obtain a local model parameter.

In this embodiment, the global model is first initialized and delivered. A deep neural network model, such as a multi-layer convolutional neural network model, is first issued as an initial global model. The initial global parameter of the model may be obtained through random initialization or be set empirically based on historical tasks. The global model and the initial global parameter are transmitted to each edge node through the network.

Then, the edge node performs local training. After receiving the global model, the edge node inputs a local dataset (for example, radio data collected by a radar receiver) into the global model and perform a specific number of rounds of local training, to update the local model parameter.

Specifically, each round of updating the local model parameter is completed by solving the problem of minimizing the optimization function. The edge node $D_i$ stores its own local data, and each data sample in the local data may be denoted as $s_k=(x_k, y_k)$, where $x_k$ is a high-dimensional vector, each $x_k$ represents a piece of data, and corresponding $y_k$ is a classification label of this piece of data. For example, a frame of wireless signal collected by a sensor is $x_k$, and $x_k$ is a two-dimensional vector that stores signal strength at different locations. A class corresponding to this frame is $y_k$, and $y_k$ is a scalar. For example, the class of "human movement" is recorded as $y_k=1$, and "no human movement" is recorded as $y_k=0$. Due to the diversity and complexity of data sources, $x_k$ may be higher-dimensional data, and $x_k$ is uniformly referred to as a high-dimensional vector. The purpose of the local model is to minimize the loss function $f(\omega_i, S_i)$, where $\omega_i$ is the local model parameter of the edge node $D_i$, and $S_i$ is the local data of the edge node $D_i$. The edge node $D_i$ starts training after receiving an iterative global parameter of a $(l-1)^{th}$ aggregation iteration epoch (in this embodiment, each time the iterative global parameter is updated, one aggregation iteration epoch is recorded, and each aggregation iteration epoch includes multiple iterative updates of local model parameters of multiple edge nodes; at the beginning of an $l^{th}$ aggregation iteration epoch, the iterative global parameter finally obtained in the $(l-1)^{th}$ aggregation iteration epoch is used as an initial local model parameter for the next iteration of each edge node, to start a new round of updating the local model parameter). A local model parameter $\omega_i^{(m,l)}$ of an $m^{th}$ iteration in the $l^{th}$ epoch, that is, the local model parameter, is updated with the following formula:

$$\omega_i^{(m,l)} = \omega_i^{(m-1,l)} - \gamma \nabla f(\omega_i^{(m,l)}, S_i^m).$$

$\gamma$ indicates a learning rate, i indicated an $i^{th}$ edge node, $\omega_i^{(m,l)}$ indicates a local model parameter of the $i^{th}$ edge node after an $m^{th}$ local iteration in the $l^{th}$ round of aggregation iteration (l indicates one aggregation iteration update of the iterative global parameter, and m indicates one iteration update of the local model parameter in each aggregation iteration), and $\nabla f(\omega_i^{(m,l)}, S_i^m)$ indicates calculating a gradient of the loss function $f(w_i, S_i)$ to the local model parameter by using the local dataset $S_i$, where $\nabla$ is a gradient operator. $\omega_i^{(m,l)} = \omega_i^{(m-1,l)} - \gamma \nabla f(\omega_i^{(m,l)}, S_i^m)$ means subtracting a currently calculated gradient from the local model parameter $\omega_i^{(m-1,l)}$ in the previous aggregation iteration, to obtain a result of the new aggregation iteration, that is, the local model parameter is updated, and the learning rate $\gamma$ is a coefficient that controls the update speed.

S2: The edge node uploads the local model parameter to a corresponding miner, where each edge node corresponds to one miner.

After training the local model parameter, each edge node uploads the updated local model parameter to the corresponding miner. For example, the edge node $D_i$ is connected to the miner $M_j$. After completing training the local model parameter, the edge node $D_i$ uploads the local model parameter to $M_j$.

S3: Each miner saves and broadcasts the received local model parameter.

In each aggregation iteration epoch, each edge node updates the local model parameter for multiple times. After updating the local model parameter for a specific number of times, the corresponding miner broadcasts the updated local model parameter, such that each miner is informed of updated local model parameters of all nodes.

S4: The miner receiving broadcast information stores the received local model parameter in a memory pool.

When the miner $M_j$ receives the local model parameter sent by the edge node $D_i$, the miner packages information related to the local model parameter into transaction information, including the local model parameter, a time parameter, and information about the node and the miner. The miner saves the transaction information in the memory pool and broadcasts the transaction information to other miners in the blockchain layer. Other miners receive and verify the transaction information. The transaction information specifically includes information such as the updated local model parameter, a number of the edge node $D_i$ that generates the local model parameter, a start time point, an elapsed time and a number of the corresponding miner $M_j$.

Figure 2:
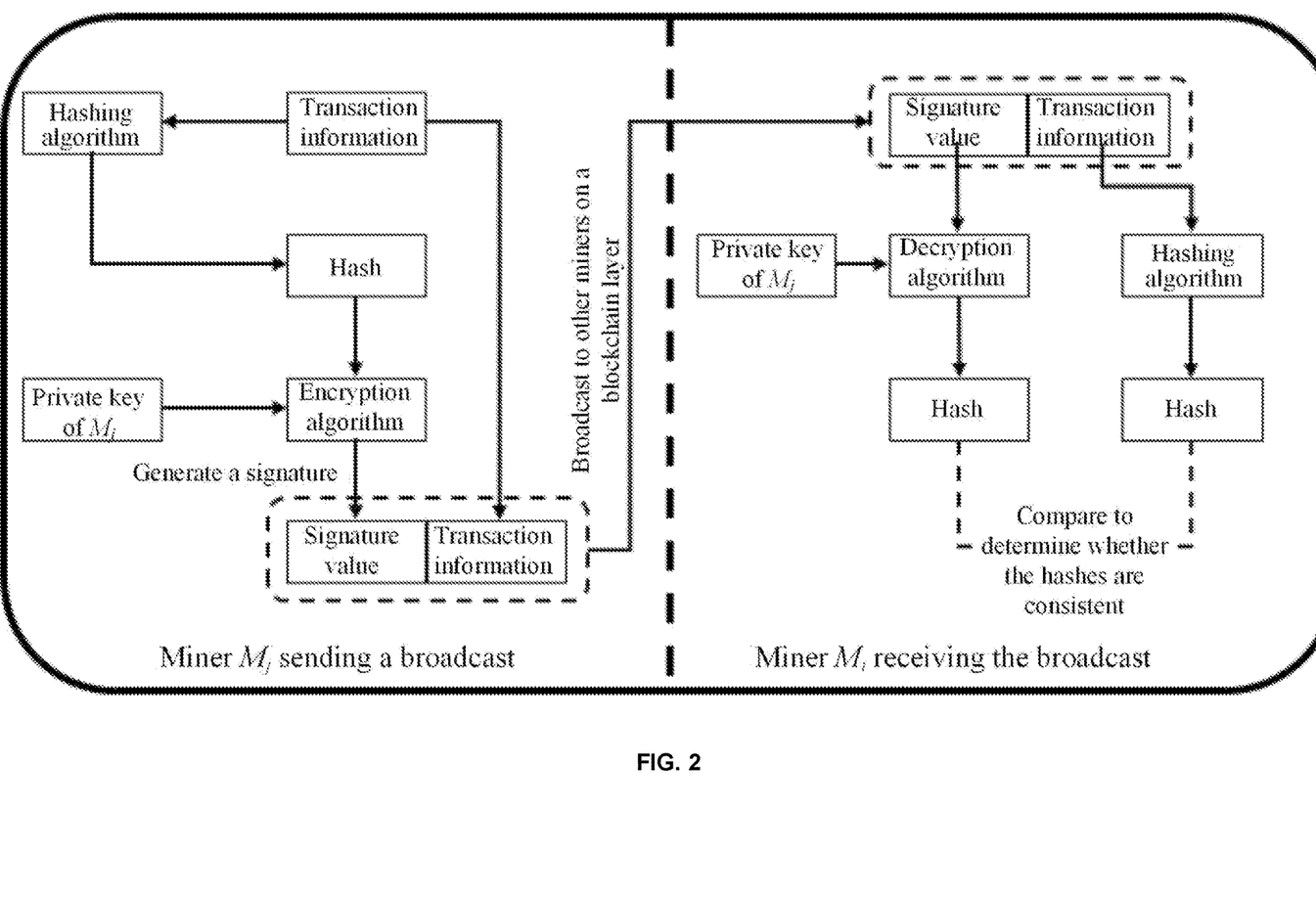
FIG. 2 is a schematic diagram of a process of performing digital signature verification on broadcast information according to Embodiment 1 of the present disclosure.

Further, the broadcast information is verified.

The transaction information is verified by using a digital signature. The digital signature is used to verify transmitted information and the identity of an information sender through asymmetric encryption. A basic process is shown in FIG. 2. The miner $M_j$ first calculates a hash $H_j$ of the transaction information by using a hashing algorithm, then encrypts the hash with a private key to generate signature information, and broadcasts the signature information and the transaction information. When receiving the transaction information broadcast by the miner $M_j$, a miner $M_i$ first decrypts the signature information by using a public key of the miner $M_j$ and verifies whether the signature information belongs to the miner $M_j$. At the same time, the miner $M_i$ performs a hashing operation on the transaction information to obtain a hash $H_i$ and verifies whether $H_i$ equals $H_j$. If yes, it indicates that the transaction information is transmitted correctly and the miner $M_i$ puts the verified transaction information into its memory pool; otherwise, it indicates that the transaction information has been changed and the miner $M_i$ discards the transaction information.

S5: The miner sends local model parameters in the memory pool to the corresponding edge node when a number of the local model parameters in the memory pool of the miner exceeds a specified threshold.

When the memory pool of the miner $M_j$ is full or a preset block generation time arrives, it is assumed that all the edge nodes have uploaded the local model parameters, and the updated parameters of the local models are stored in the memory pool as transactions. In this case, the miner $M_j$ starts mining.

The purpose of this embodiment is to perform aggregation on the local model parameters of all the edge nodes after each edge node completes multiple iterations of the local model parameter. To achieve this, a size of the memory pool of each miner may be set to a total number of the edge nodes. For example, there are a total of 100 edge nodes, and the size of the memory pool is set to 100. When the memory pool of the miner is full, it means that all the edge nodes update the local model parameters and a new iterative global parameter can be aggregated.

Then the miner sends to the corresponding edge node all the transaction information to be packaged into a block.

S6: The edge node assigns a weight to each of the received local model parameters and the local model parameter of the edge node based on validity of the local model parameters.

The edge node $D_i$ evaluates the validity of the local model parameter in each piece of transaction information and assigns an objectively generated weight to the local model parameter in each piece of transaction information. It is assumed that the set of all transaction information is $T=\{T_1, T_2, \ldots, T_{N_T}\}$, where $N_T=|T|$. A weight of a local model parameter in transaction information $T_i$ ($i=1, 2, \ldots, N_T$) can be denoted as $C_i$ and a set of weights can be denoted as $C=\{C_1, C_2, \ldots, C_{N_T}\}$.

Specifically, the edge node calculates the weight of each local model parameter by using a CRiteria Importance Through Intercriteria Correlation (CRITIC) method and an algorithm for Newton's law of cooling.

S7: The edge node aggregates, based on the weight, weighted aggregation on all the received local model parameters and the local model parameter of the edge node, to obtain the iterative global parameter.

The edge node $D_i$ performs weighted aggregation on the local model parameters in all the transaction information based on the generated weights, to obtain a new global model parameter, denoted as the iterative global parameter. The iterative global parameter of the $l^{th}$ round of aggregation iteration may be denoted as:

$$\omega^l = \frac{c_l^{l-1}}{c_l^{l-1} + c_l^l}\omega^{l-1} + \sum_{i=1}^{N_T}\frac{c_i}{c_l^{l-1} + c_l^l}\omega_i^l.$$

$\omega^l$ indicates the iterative global parameter of the $l^{th}$ round of aggregation iteration, $\omega^{l-1}$ indicates an iterative global parameter of the $(l-1)^{th}$ round of aggregation iteration, $\omega_i^l$ is a local model parameter in an $i^{th}$ piece of transaction information in the $l^{th}$ round of aggregation iteration, $C_l^{l-1}$ indicates a validity assessment score of the iterative global parameter $\omega^{l-1}$ in the $l^{th}$ round of aggregation iteration (in this embodiment, the score is the weight), and $$C_l^l = \sum_{i=1}^{N_T} C_i$$

indicates a sum or validity assessment scores of local model parameters in all transaction information in the $l^{th}$ round of aggregation iteration. After obtaining $\omega^l$, the edge node $D_i$ uploads information such as the iterative global parameter $\omega^l$ obtained in the $l^{th}$ round of aggregation iteration and the scores of the local model parameters to the miner $M_j$. It should be noted that the $l^{th}$ round here has the same meaning as the $l^{th}$ epoch mentioned above.

S8: The miner adds the iterative global parameter to a generated block and broadcasts and performs digital signature verification on the iterative global parameter.

Specifically, the iterative global parameter is added to a candidate block generated by the miner to obtain a parameter block; a random number in the parameter block is adjusted through incrementing, and a hash of the parameter block is calculated; the parameter block is broadcast when the hash is smaller than a preset hash; and the broadcast parameter block is verified.

In this embodiment, the block is generated as follows: According to the Proof of Work (PoW) algorithm, each miner needs to solve a difficult mathematical problem based on SHA256. SHA256 is a one-way hashing function for block generation. There is a difficulty indicator for determining a target value. In simple terms, the miner increments a random number Nonce to calculate the hash. When a calculated hash is smaller than the target value, the miner generates a new block. The block includes information such as a block header, the miner number, a computing node number for each transaction, the weight, the local parameter, and the iterative global parameter. In this embodiment, a hash is preset as the target value, that is, the preset hash.

The block is specifically generated in the following steps: The miner needs to construct a candidate block first. The block includes not only the transaction information taken from the memory pool, but also the information such as a block size, the block header, the miner number, and a timestamp. The block size is a total volume of all data in the block; the block header may be regarded as thumbnail information of the whole block, and block information used for mining is the block header; the transaction data is all the transaction information in the block, that is, the local model parameters of all the nodes and the iterative global parameter obtained through aggregation.

Figure 3:
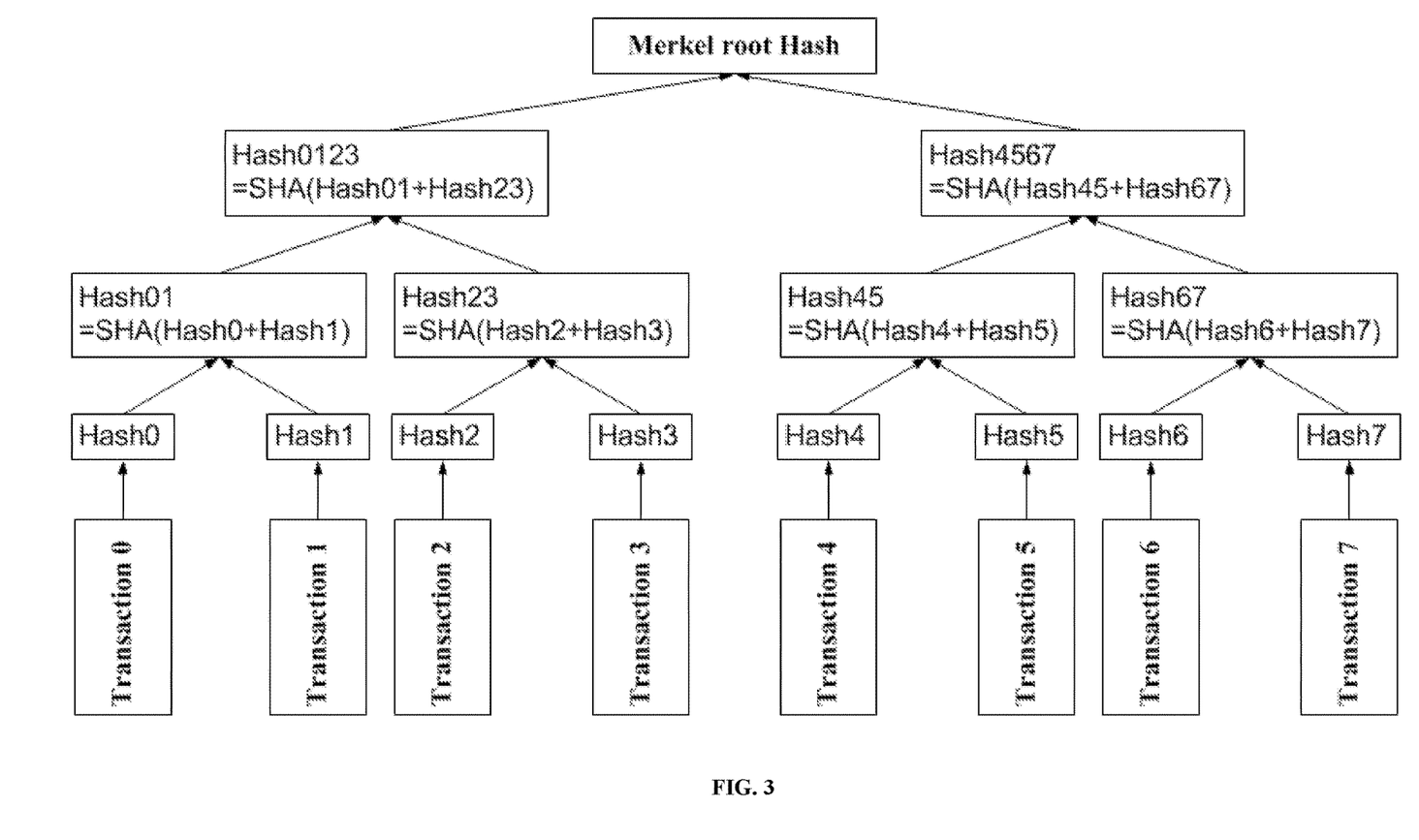
FIG. 3 is a schematic structural diagram of a Merkle tree of transaction information according to Embodiment 1 of the present disclosure.

In the block, the block header is the most critical information, which contains all characteristic information of the whole block, mainly including: a hash of a previous block, a Merkle root, the timestamp, the preset hash and the random number. The hash of the previous block, or referred to as the parent block hash, is used to locate the previous block and ensure that all blocks form a single chained structure, which can effectively prevent malicious tampering with the block data. The Merkle root is a Merkle tree constructed by using hashes of all transaction data, and a root hash of the Merkle tree is the Merkle root (see FIG. 3 for the structure of the Merkle tree of the transaction data). Due to the sensitivity of the hashing algorithm, a small change in any piece of transaction data has a rippling effect, resulting in a huge change in the root hash of the Merkle tree. Thus the Merkle root can be regarded as the fingerprint of the entire transaction. The timestamp is the time when the candidate block was created. The candidate block created by the miner is only valid when the hash of the block is smaller than the preset hash. The preset hash is determined by the mining difficulty. When the mining difficulty becomes larger, the preset hash becomes smaller, and it becomes more difficult for the miner to find a hash that meets the requirements. A part above the block header is relatively fixed. Therefore, it is necessary to introduce a piece of variable data, that is, the random number Nonce. By modifying the random number, the hash of the candidate block can be adjusted.

After the candidate block is constructed, the miner changes the hash of the candidate block by incrementally adjusting the random number Nonce in the block header, that is, adding 1 to the value of Nonce. Then, the hash of the candidate block is recalculated. When the hash of the candidate block is smaller than the preset hash, this candidate block is a new valid block. It should be noted that the role of the blockchain in this embodiment is to provide a distributed and trusted support framework, and the preset hash only needs to enable timely generation of the new block.

Block broadcast and verification: If a miner $M_u \in M$ is the first miner finding qualified Nonce, a candidate block of the miner $M_u$ is broadcast to other miners as a new block. After receiving the broadcast, the other miners verify the new block. In this case, the new block is created and verified, and the information such as the local model parameters of all the nodes and the iterative global parameter generated through aggregation in this round is saved on the blockchain of the miners.

When the block is verified, the correctness of the transaction information and the iterative global parameter in the block is also verified. The miner $M_u$ first calculates a hash $H_u$ of the new block, then encrypts the new block with a private key, generates signature information, and subsequently broadcasts the signature information and the new block. When receiving the new block broadcast by the miner $M_u$, a miner $M_r$ first decrypts the signature information by using a public key of the miner $M_u$, and verifies whether the signature information belongs to the miner $M_u$. At the same time, the miner $M_r$ performs a hashing operation on the new block to obtain a hash $H_r$ and verifies whether $H_r$ equals $H_u$. If yes, it indicates that the new block is transmitted correctly; otherwise, it indicates that the block has been changed. Afterwards, the miner $M_r$ compares the transaction information in the new block with locally stored transaction information. If the transaction information is not consistent, it is assumed that the miner $M_u$ tampers with the data. Finally, the miner $M_r$ verifies the correctness of weight information, then calculates the iterative global parameter by using the weight information and the transaction information, and verifies the correctness of the iterative global parameter. If the calculation result of the weight information or the iterative global parameter is inconsistent with the locally stored weight information or iterative global parameter, it indicates that the miner $M_u$ is a malicious node or the information was tampered with during transmission, the received block is rejected, and a new round of training is restarted with a global model parameter in a previous block.

S9: The edge node determines whether the iterative global parameter meets a preset condition; and if yes, uses the iterative global parameter as a final global parameter; or if not, substitutes the iterative global parameter into the global model, and returns to the step of locally training the global model by using local data, to obtain a local model parameter.

The edge node determines whether the iterative global parameter reaches required accuracy or a specified number of global aggregation rounds; and if yes, the task is completed; otherwise, the latest iterative global parameter is used as the initial global parameter and the above steps are repeated. To determine whether the iterative global parameter reaches the required accuracy, the latest iterative global parameter may be substituted into the global model and then testing is performed on a test dataset. For example, in a task of pedestrian detection in a smart plant using distributed cameras in collaboration, testing can be performed on camera video data prepared in advance. If recognition accuracy of the latest iterative global parameter meets the requirements, it is considered that the current model parameter after the previous steps meets the requirements for completing the task. Alternatively, a number of iterations of global aggregation can be specified, for example, it can be specified that 100 repetitions of the above steps meet the requirements.

The iterative global parameter obtained by the above steps can be distributed to the edge nodes to complete the corresponding sensing tasks. For example, the global model that meets the requirements is distributed to each radio transceiver in the plant to complete the pedestrian sensing task.

In an optional implementation, when the edge node in this embodiment assigns the weight to each of the received local model parameters and the local model parameter of the edge node based on the validity of the local model parameters, the specific weight generation method includes:

The weight of each local model parameter uploaded by each edge node affects the magnitude of the impact of the local model parameter during aggregation. In this embodiment, the weight of the local model parameter is calculated by using the CRITIC method and the algorithm for Newton's law of cooling, to determine the validity and training performance of the edge node. The CRITIC method measures objective weights of metrics based on the contrast intensity of and the conflict among the evaluation criteria. The contrast intensity is the value difference of a same criterion in different evaluation schemes, and is expressed in the form of standard deviation. The conflict among the criteria is expressed as a correlation coefficient. Specifically, the weight of the parameter is evaluated by using criteria such as a size of a dataset corresponding to an edge node providing the local model parameter, correlation with other local model parameters, and the precision and historical score of the local model parameter.

It is assumed that $\omega_i = \{\omega_{i1}, \omega_{i2}, \ldots, \omega_{iP}\}$, ($i \in \{1, 2, \ldots, N_D\}$) is a set of all local model parameters uploaded by the edge node $D_i$, $\omega_j = \{\omega_{j1}, \omega_{j2}, \ldots, \omega_{jP}\}$, ($j \in \{1, 2, \ldots, N_D\}$) is a set of all local model parameters uploaded by the edge node $D_j$, and P is a number of parameters of each model. The Pearson correlation coefficient $r_{ij}$ is used to indicate the degree of correlation between the local model of the edge node $D_i$ and the local model of the edge node $D_j$:

$$r_{ij} = \frac{\sum_{k=1}^{P}(\omega_{ik} - \overline{\omega_I})(\omega_{jk} - \overline{\omega_J})}{\sqrt{\sum_{k=1}^{P}(\omega_{ik} - \overline{\omega_I})^2}\sqrt{\sum_{k=1}^{P}(\omega_{jk} - \overline{\omega_J})^2}}$$

A larger $r_{ij}$ indicates higher degree of correlation between $\omega_i$ and $\omega_j$, that is, the higher degree of correlation between the local model parameter of the edge node $D_i$ and the local model parameter of the edge node $D_{j1}$. $\overline{\omega_1}$ indicates to average all the parameters in the set of $\omega_i$, $$\sum_{k=1}^{P}$$

is the summation symbol and k is a criterion variable in the summation process with values from 1 to P.

Local data of the edge node $D_i$ is denoted as $S_i$, where $|S_i|=N_i$ indicates the size of the local dataset. It is assumed that the score of the edge node $D_i$ in the $(l-1)^{th}$ round of aggregation is $C_i^{l-1}$. A number of transactions in a block newly generated by the miner $M_j$ is $N_T$, a size of a local dataset in an edge node $D_j$ corresponding to a local model parameter in a transaction $T_j$ is $N_j$, training accuracy of the local model is $A_j$ (after the edge node updates the local model for multiple times, the training accuracy of the local model on the local dataset is obtained, which indicates the accuracy of an output result after the local dataset is input into the current local model), a historical score is $C_j^{l-1}$ (the historical score herein is obtained as follows: an initial value $C_j^0$ is set in advance for round 1 to calculate $C_j^1$, and a historical score of the previous round is used for calculation in each subsequent round), and the normalized average correlation between the local model parameter $w_j$ and the rest of $N_T-1$ local model parameters $\omega_t$ in the block is $r_j$, where $t \in \{1, 2, \ldots, N_T\}$, $t \neq j$. $r_j$ is calculated as follows: First, a Pearson correlation coefficient $r_{jt}$ between the local model parameter $\omega_j$ and a local model parameter $\omega_t$ of each edge node is calculated, and the set of obtained Pearson correlation coefficients with other $N_T-1$ local model parameters is $r=\{r_{j1}, r_{j2}, \ldots, r_{jN_T}\}$, then normalization is performed on r, that is, $r_{jt}'=(r_{jt}-\min(r))/(\max(r)-\min(r))$, and then averaging is performed to obtain $r_j=\Sigma r_{jt}'/(N_T-1)$.

For the sake of convenience, in the following, $x_{cj}$ (c=1, 2, 3, 4, j=1, 2, \ldots, $N_T$) is used to indicate four criteria: $N_j$, $A_j$, $C_j^{l-1}$ and $r_j$, that is, $x_{1j}=N_j$, $x_{2j}=A_j$, $x_{3j}=S_j^{l-1}$, $x_{4j}=r_j$.

The proportion of the criterion $x_{cj}$ in the four criteria may be expressed as:

$$P_{cj} = \frac{x_{cj}}{\sum_{j=1}^{N_T} x_{cj}}$$

The standard deviation $SD_c$ is used to indicate the contrast intensity of the $c^{th}$ criterion. First, the mean $$\overline{P_i} = \frac{1}{n}\sum_{j=1}^{N_T} P_{ij}$$

of the $c^{th}$ criterion $P_{c1}, P_{c2}, \ldots, P_{cN_T}$ of all the edge nodes is calculated, and then the standard deviation of the $c^{th}$ criterion is obtained. $P_{c1}, P_{c2}, \ldots, P_{cN_T}$ indicate the $c^{th}$ criterion of all the edge nodes.

$$SD_c = \sqrt{\frac{\sum_{j=1}^{N_T}(P_{cj} - \overline{P_t})^2}{n-1}}$$

$P_{cj}$ indicates the $c^{th}$ criterion of the $j^{th}$ edge node.

Then, the correlation coefficient $R_c$ is used to indicate the conflict of the criterion. A large correlation coefficient of a criterion indicates less conflict with other criteria, less information provided by the criterion and a lower weight. First, the degree of correlation $r_{ck}$ between different criteria needs to be calculated. The Pearson correlation coefficient between the $c^{th}$ criterion and the $k^{th}$ criterion is:

$$r_{ck} = \frac{\sum_{j=1}^{N_T}(P_{cj} - \overline{P_t})(P_{kj} - \overline{P_k})}{\sqrt{\sum_{j=1}^{N_T}(P_{cj} - \overline{P_t})^2}\sqrt{\sum_{j=1}^{N_T}(P_{kj} - \overline{P_k})^2}}$$

$P_{kj}$ indicates a $k^{th}$ criterion of the $j^{th}$ edge node and $\overline{P_k}$ indicates the mean value of the $k^{th}$ criterion of all the edge nodes.

The correlation coefficient $R_c$ is:

$$R_c = \sum_{k=1}^{4}(1 - r_{ck})$$

Then the information amount $H_c$ of the $c^{th}$ criterion is calculated based on the standard deviation $SD_c$ and the correlation coefficient $R_c$.

$$H_c = SD_c \times \sum_{k=1}^{4}(1 - r_{ck}) = SD_c \times R_c$$

Therefore, the objective weight $W_c$ of the $c^{th}$ criterion is:

$$W_C = \frac{H_c}{\sum_{c=1}^{4} H_c}$$

Thus, the weight $S_{T_j}$ of the transaction information $T_j$ corresponding to the edge node $D_j$ (that is, the weight of the corresponding local model parameter) is obtained:

$$S_{T_j} = \sum_{c=1}^{4} W_c \times P_{cj}$$

However, this result cannot be directly used as the weight of each set of parameters during global model aggregation, because the update of local model parameters of some nodes may be outdated, which affects the accuracy of the global model. In addition, the proportion of the score of the old global model needs to decrease with time. Therefore, the score of each set of parameters needs to be adjusted by using the algorithm for Newton's law of cooling when the global model is aggregated. Specifically, the timeliness of the local model parameter $\omega_j$ in the transaction information $T_j$ described above at the moment t may be expressed as:

$$R(t) = R_0 \cdot e^{-d(t-t_0)}$$

$R_0$ indicates the freshness of the moment $t_0$, and d is the decay coefficient and is determined by the system. Larger d indicates a smaller score of a model with long training time during global model aggregation.

Assuming that $C_{l-1}^{l-1}$ is the sum of scores of the iterative global parameter $\omega^{l-1}$ in the $(l-1)^{th}$ round and $t^{l-1}$ is a time at which the last block was uploaded, $$C_l^{l-1} = C_{l-1}^{l-1} \cdot R_0 \cdot e^{-d(t-t^{l-1})}$$

$C_l^{l-1}$ indicates the sum of scores of the iterative global parameter $\omega^{l-1}$ in the $l^{th}$ round after correction with the algorithm for Newton's law of cooling.

It is assumed that $t_0^j$ is the training start time of the local model parameter $\omega_j$ in the transaction information $T_j$. Then the score of the adjusted local model parameter $\omega_j$ can be obtained:

$$C_j = S_{T_j} \cdot R_0 \cdot e^{-d(t-t_0^j)}$$

$S_{T_j}$ indicates the weight of the transaction information $T_j$ corresponding to the edge node $D_j$.

The update formula of the global parameter mentioned in step 5 can then be obtained:

$$\omega^l = \frac{c_l^{l-1}}{c_l^{l-1} + c_l^j} \omega^{l-1} + \sum_{i=1}^{N_T} \frac{c_i}{c_l^j} \omega_i^l$$

After the above steps, the weight of the local model parameter in each piece of transaction information is adjusted during global aggregation and decayed with time, to prevent the outdated model from affecting the accuracy of the global model.

In a specific implementation, the present disclosure may be used in a smart plant to achieve intelligent safety management by using sensors located at different locations jointly for sensing and identifying worker movement.

In the round 1, an initial global model, such as a convolutional neural network-based model, is first designed. The purpose of the model is to realize a function of "inputting sensor data and outputting the presence or absence of a human body" after a series of training. The initial global model is distributed to the edge nodes as the initial local model. Subsequently, each edge node trains the local model by using local sensor data, and performs multiple iterations to make a recognition result obtained by inputting data into the model closer to the real result. When an edge node completes training the local model in this epoch, the edge node uploads an updated local model parameter to a corresponding miner. The miner packages and stores the information in the memory pool and broadcasts the information to other miners. The other miners receive and verify the broadcast information and then store the broadcast information in their own memory pools. When a miner's memory pool is full, the miner packages and sends all the transaction information to a corresponding node. The node calculates a weight of each piece of information and then performs weighted aggregation to obtain a new global model parameter, that is, the iterative global parameter. The miner starts mining, generates a new block and stores the block on the blockchain. The block includes information such as the iterative global parameter obtained in this round of aggregation. Each miner verifies the new block; and if the accuracy of the global model meets the specified requirements, the training process ends and the iterative global model is sent to each node for human recognition by a sensor; otherwise, a next round starts.

Round 2: The iterative global parameter in the latest block obtained in the previous round is distributed to each edge node as the initial local model parameter of each edge node in this round, and then each edge node starts a new round of training. The subsequent process is the same as round 1. The rest can be done in the same manner until the global model obtained in a round meets the requirements.

The distributed trusted sensing method for an integrated communication, sensing, and computation network according to the present disclosure can be used for distributed human sensing tasks in large-scale edge wireless networks in multiple scenarios. For smart plants, sensor data and computation resources from multiple workshops can be utilized collaboratively for recognition on the premise of data security of all parties, to achieve smart safe management. Compared with the conventional centralized processing solution, this solution avoids the computation pressure and communication pressure caused by combining original datasets of all workshops for processing, and effectively realizes credible ubiquitous sensing in the industrial Internet scenario where sensing, computation and communication are integrated. This not only efficiently utilizes the computation and data resources of each distributed edge node, but also ensures that the original dataset of each node is not exposed to each other. The whole process is credible, which is ideally suitable for many tasks that are sensitive to data security but require multi-party data collaboration for sensing and computation.

Embodiment 2

This embodiment provides a distributed trusted sensing system for an integrated communication, sensing, and computation network. The system includes multiple edge nodes and multiple miners, where each edge node corresponds to one miner.

The edge nodes each are configured to:
obtain a global model and an initial global parameter, substitute the initial global parameter into the global model, and locally train the global model by using local data, to obtain a local model parameter;
upload the local model parameter to a corresponding miner;
assign a weight to each of received local model parameters and the local model parameter of the edge node based on validity of the local model parameters;
perform, based on the weight, weighted aggregation on all the received local model parameters and the local model parameter of the edge node, to obtain an iterative global parameter;
determine whether the iterative global parameter meets a preset condition; and if yes, use the iterative global parameter as a final global parameter; or if not, substitute the iterative global parameter into the global model, and return to the step of locally training the global model by using local data, to obtain a local model parameter; and
the miners each are configured to:
save and broadcast the received local model parameter;
store the received local model parameter in a memory pool;
send local model parameters in the memory pool to the corresponding edge node when a number of the local model parameters in the memory pool exceeds a specified threshold; and
add the iterative global parameter to a generated block, and broadcast and perform verification on the iterative global parameter.

The framework proposed in this embodiment is divided into a blockchain layer and a computation layer. It should be noted that the framework proposed in this embodiment does not limit the specific type of data. For example, the data may be video data collected by distributed cameras in a smart plant, or vehicle movement information collected by different vehicles and roadside traffic facilities in the Internet of Vehicle. The framework provided in this embodiment may be used for, sensing tasks including but not limited to the above scenarios, in which multiple nodes need to be connected to each other and distributed computation is needed to achieve a specific purpose.

Specific examples are used herein to explain the principles and embodiments of the present disclosure. The foregoing description of the embodiments is merely intended to help understand the method of the present disclosure and its core ideas; besides, various modifications may be made by a person of ordinary skill in the art to specific embodiments and the scope of application in accordance with the ideas of the present disclosure. In conclusion, the content of the present description shall not be construed as limitations to the present disclosure.

What is claimed is:

1. A distributed trusted sensing method for an integrated communication, sensing, and computation network, comprising:
obtaining, by an edge node, a global model and an initial global parameter, substituting the initial global parameter into the global model, and locally training the global model by using local data, to obtain a local model parameter;
uploading, by the edge node, the local model parameter to a corresponding miner, wherein each edge node corresponds to one miner;
saving and broadcasting, by each miner, the received local model parameter;
storing, by a miner receiving broadcast information, the received local model parameter in a memory pool;
sending, by the miner, local model parameters in the memory pool to the corresponding edge node when a number of the local model parameters in the memory pool of the miner exceeds a specified threshold;
assigning, by the edge node, a weight to each of the received local model parameters and the local model parameter of the edge node based on validity of the local model parameters;
performing, by the edge node based on the weight, weighted aggregation on all the received local model parameters and the local model parameter of the edge node, to obtain an iterative global parameter;
adding, by the miner, the iterative global parameter to a generated block, and broadcasting and performing digital signature verification on the iterative global parameter; and
determining, by the edge node, whether the iterative global parameter meets a preset condition; and if yes, using the iterative global parameter as a final global parameter; or if not, substituting the iterative global parameter into the global model, and returning to the step of locally training the global model by using local data, to obtain a local model parameter.

2. The distributed trusted sensing method for an integrated communication, sensing, and computation network according to claim 1, wherein the storing, by a miner receiving broadcast information, the received local model parameter in a memory pool specifically comprises:

packaging, by the miner receiving the broadcast information, the local model parameter, a time parameter for generating the local model parameter, a parameter of the edge node for generating the local model parameter, and a corresponding miner parameter as transaction information and storing the transaction information in the memory pool.

3. The distributed trusted sensing method for an integrated communication, sensing, and computation network according to claim 1, after the saving and broadcasting, by each miner, the received local model parameter, further comprising:
performing digital signature verification on the broadcast information.

4. The distributed trusted sensing method for an integrated communication, sensing, and computation network according to claim 1, wherein an update formula of the local model parameter is: $\omega_i^{(m,l)} = \omega_i^{(m-1,l)} - \gamma \nabla f(\omega_i^{(m,l)}, S_i^m)$, wherein
$\gamma$ indicates a learning rate, i indicates an $i^{th}$ edge node, $w_i^{(m,l)}$ indicates a local model parameter of the $i^{th}$ edge node after an $m^{th}$ local iteration in an $l^{th}$ round of aggregation iteration, and $\nabla f(\omega_i^{(m,l)}, S_i^m)$ indicates calculating a gradient of a loss function $f(w_i, S_i)$ to the local model parameter by using a local dataset $S_i$.

5. The distributed trusted sensing method for an integrated communication, sensing, and computation network according to claim 1, wherein an update formula of the iterative global parameter is $$\omega^l = \frac{c_l^{l-s}}{c_l^{l-t} + c_l^l} \omega^{l-1} + \sum_{i=1}^{N_T} \frac{c_i}{c_l^{l-1} + c_l^l} \omega_i^l,$$

wherein
$\omega^l$ indicates an iterative global parameter of an $l^{th}$ round of aggregation iteration, $\omega^{l-1}$ indicates an iterative global parameter of an $(l-1)^{th}$ round of aggregation iteration, $\omega_i^l$ is a local model parameter in an $i^{th}$ piece of transaction information in the $l^{th}$ round of aggregation iteration, $C_l^{l-1}$ indicates a validity assessment score of the iterative global parameter $\omega^{l-1}$ in the $l^{th}$ round of aggregation iteration, $$C_l^l = \sum_{i=1}^{N_T} C_i$$

indicates a sum or validity assessment scores of local model parameters in all transaction information in the $l^{th}$ round of aggregation iteration, $C_i$ indicates a validity assessment score of the local model parameter in the $i^{th}$ piece of transaction information, and NT is a total number of pieces of the transaction information.

6. The distributed trusted sensing method for an integrated communication, sensing, and computation network according to claim 1, wherein the initial global parameter is obtained by random initialization or is set empirically.

7. The distributed trusted sensing method for an integrated communication, sensing, and computation network according to claim 1, wherein the broadcasting and performing digital signature verification on the iterative global parameter specifically comprises:
adding the iterative global parameter to a candidate block generated by the miner to obtain a parameter block;
adjusting a random number in the parameter block by incrementing and calculating a hash of the parameter block;
broadcasting the parameter block when the hash is lower than a preset hash; and
performing digital signature verification on the broadcast parameter block.

8. The distributed trusted sensing method for an integrated communication, sensing, and computation network according to claim 1, wherein the determining whether the iterative global parameter meets a preset condition specifically comprises:
determining whether the iterative global parameter reaches specified accuracy or whether a number of aggregation iterations reaches a specified number of aggregation rounds.

9. The distributed trusted sensing method for an integrated communication, sensing, and computation network according to claim 1, wherein the assigning, by the edge node, a weight to each of the received local model parameters based on validity of the local model parameters specifically comprises:
calculating, by the edge node, the weight of each of the local model parameters by using a CRiteria Importance Through Intercriteria Correlation (CRITIC) method and an algorithm for Newton's law of cooling.

10. A distributed trusted sensing system for an integrated communication, sensing, and computation network, comprising multiple edge nodes and multiple miners, wherein each edge node corresponds to one miner;
the edge nodes each comprises a processor and a memory storing program codes, wherein the processor performs the stored codes to:
obtain a global model and an initial global parameter, substitute the initial global parameter into the global model, and locally train the global model by using local data, to obtain a local model parameter;
upload the local model parameter to a corresponding miner;
assign a weight to each of received local model parameters and the local model parameter of the edge node based on validity of the local model parameters;
perform, based on the weight, weighted aggregation on all the received local model parameters and the local model parameter of the edge node, to obtain an iterative global parameter;
determine whether the iterative global parameter meets a preset condition; and if yes, use the iterative global parameter as a final global parameter; or if not, substitute the iterative global parameter into the global model, and return to the step of locally training the global model by using local data, to obtain a local model parameter; and
the miners each comprises a processor and a memory storing program codes, wherein the processor performs the stored program codes to:
save and broadcast the received local model parameter;
store the received local model parameter in a memory pool;
send local model parameters in the memory pool to the corresponding edge node when a number of the local model parameters in the memory pool exceeds a specified threshold; and
add the iterative global parameter to a generated block, and broadcast and perform digital signature verification on the iterative global parameter.

* * * * *